(12) United States Patent
Vannithamby et al.

(10) Patent No.: US 9,894,553 B2
(45) Date of Patent: Feb. 13, 2018

(54) EVOLVED NODE-B, USER EQUIPMENT AND METHODS FOR MISSION-CRITICAL MACHINE TYPE COMMUNICATION

(71) Applicant: Intel Corporation, Santa Clara, CA (US)

(72) Inventors: Rath Vannithamby, Portland, OR (US); Satish Chandra Jha, Hillsboro, OR (US); Mohammad Mamunur Rashid, Hillsboro, OR (US); Jing Zhu, Portland, OR (US); Maruti Gupta Hyde, Portland, OR (US); Kathiravetpillai Sivanesan, Portland, OR (US); Ali T. Koc, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 462 days.

(21) Appl. No.: 14/548,702

(22) Filed: Nov. 20, 2014

(65) Prior Publication Data

US 2016/0150437 A1    May 26, 2016

(51) Int. Cl.
  *H04W 72/04*    (2009.01)
  *H04L 12/851*   (2013.01)
  *H04W 28/02*    (2009.01)

(52) U.S. Cl.
  CPC ..... *H04W 28/0215* (2013.01); *H04W 72/044* (2013.01); *H04L 47/24* (2013.01)

(58) Field of Classification Search
  CPC ............... H04W 84/12; H04W 76/023; H04W 72/0453; H04W 72/0446; H04W 72/082;
  (Continued)

(56) References Cited

U.S. PATENT DOCUMENTS

2011/0218004 A1    9/2011  Catovic et al.
2013/0155994 A1*   6/2013  Yoshizawa ........ H04W 72/0406
                                                  370/329
(Continued)

FOREIGN PATENT DOCUMENTS

TW        201620266 A     6/2016
WO    WO-2011098264 A1    8/2011
(Continued)

OTHER PUBLICATIONS

Miguel Barreiros, Peter Lundqvist, QOS-enabled networks tools and foundations, John Wiley & Sons. Copyright 2011 p. 31.*
(Continued)

*Primary Examiner* — Marsha D. Banks Harold
*Assistant Examiner* — Natasha W Cosme
(74) *Attorney, Agent, or Firm* — Schwegman Lundberg & Woessner, P.A.

(57) ABSTRACT

Embodiments of an Evolved Node-B (eNB) to support Mission-Critical Machine Type Communication (MC-MTC) User Equipments (UEs) are disclosed herein. During a transmission notification (TN) monitoring period, the eNB may monitor for TN signals from MC-MTC UEs. When a presence of TN signals is detected, the eNB may refrain from allocation of dedicated MC-MTC traffic resources to other UEs for transmission during a traffic period. In response to a detection of an absence of TN signals from the first group of MC-MTC UEs during the TN monitoring period, the eNB may allocate the dedicated MC-MTC traffic resources to the other UEs for transmission during the traffic period. Starting times of the traffic period and the TN monitoring period may be spaced apart by a predetermined time difference. In some embodiments, the predetermined time difference for MC-MTC UEs may be not greater than 10 milliseconds.

24 Claims, 5 Drawing Sheets

(58) Field of Classification Search
CPC .......... H04W 74/0833; H04W 76/021; H04W 4/008; H04W 72/0406; H04W 72/085; H04W 72/1289; H04W 84/18; H04W 88/08; H04W 12/06; H04W 72/042; H04W 72/046
USPC ......................................................... 370/330
See application file for complete search history.

(56) References Cited

U.S. PATENT DOCUMENTS

2013/0286957 A1* 10/2013 Bucknell ............... H04W 4/005 370/329
2016/0081031 A1* 3/2016 Barriac ............. H04W 52/0261 370/311

FOREIGN PATENT DOCUMENTS

WO  WO 2014027851     *  2/2014
WO  WO-2016081127 A1    5/2016

OTHER PUBLICATIONS

"International Application Serial No. PCT/US2015/056338, International Search Report dated Jan. 29, 2016", 3 pgs.
"International Application Serial No. PCT/US2015/056338, Written Opinion dated Jan. 29, 2016", 5 pgs.
"Taiwanese Application Serial No. 104132856, Office Action dated Nov. 22, 2016", w/ Brief Translation, 12 pgs.
CATT, "Discussion on Low Cost MTC Impact", R2-141193, 3GPP TSG-RAN WG2 Meeting #85bis, (Mar. 22, 2014).
Fukitsu, "Multiplexing between cellular signal and D2D signal", R1-140198, 3GPP TSG-RAN WG1 Meeting #76, (Feb. 1, 2014).
"Taiwanese Application Serial No. 104132856, Response filed May 17, 2017 to Office Action dated Nov. 22, 2016", w/ claims in English, 108 pgs.

* cited by examiner

EVOLVED NODE-B, USER EQUIPMENT AND METHODS FOR MISSION-CRITICAL MACHINE TYPE COMMUNICATION

TECHNICAL FIELD

Some embodiments pertain to wireless communications. Some embodiments relate to cellular communication networks including LTE networks. Some embodiments relate to Machine Type Communication (MTC). Some embodiments relate to Mission-Critical MTC (MC-MTC). Some embodiments relate to fifth-generation (5G) cellular networks.

BACKGROUND

Mobile networks may support various devices that may operate according to vastly different characteristics or requirements. As an example, users of smart-phones or similar devices may wish to receive high data rates and may download large amounts of data. As another example, devices that operate according to Machine Type Communication (MTC) may transmit or receive far less data than a smart-phone. Although a network may support these and other devices with varying operational characteristics, it may not necessarily do so efficiently. Accordingly, there is a need for methods that enable network support of MTC devices and other devices. What are also needed are methods and apparatus that provide reliable and faster network access to mission-critical MTC devices.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
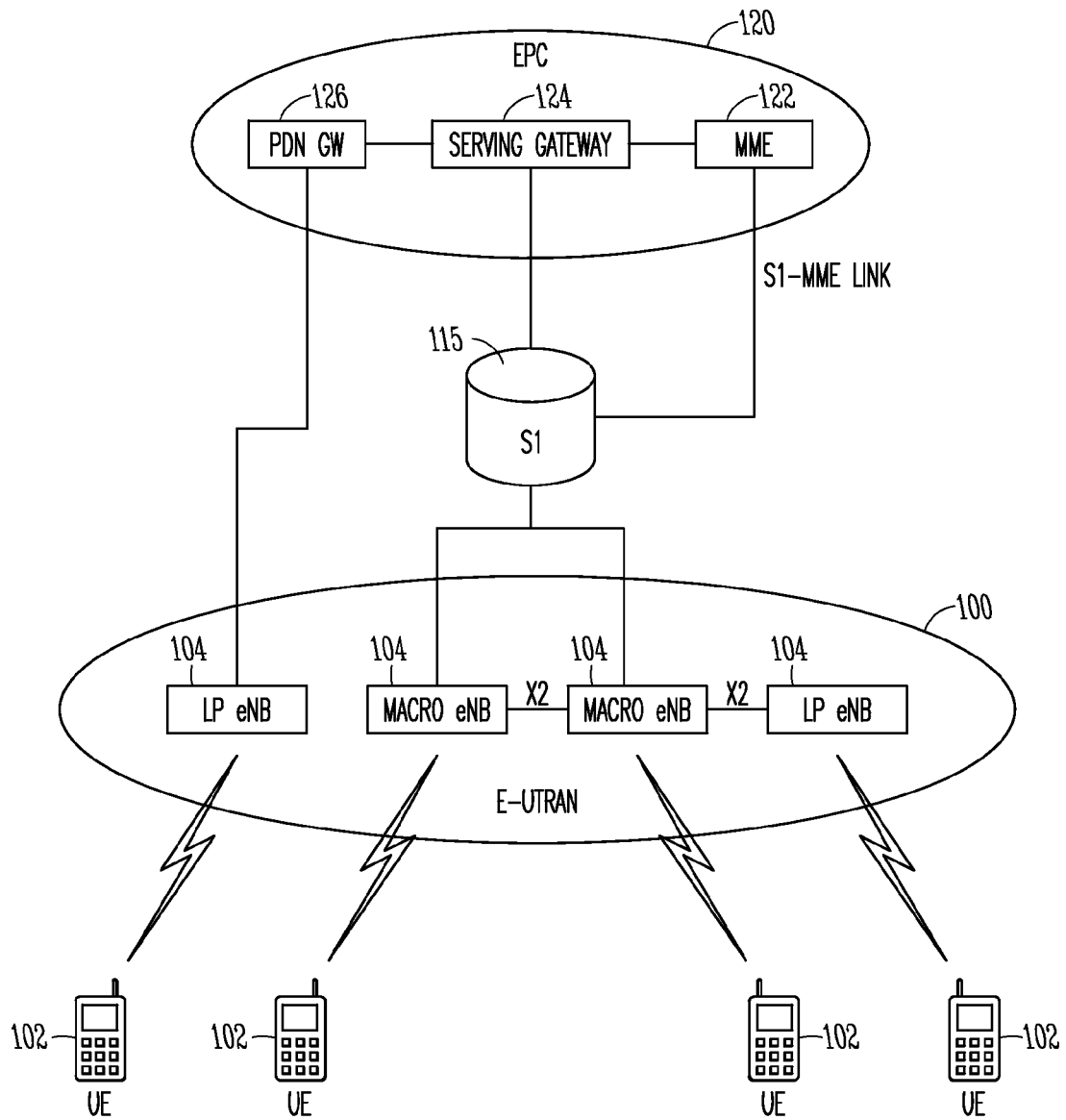
FIG. 1 is a functional diagram of a 3GPP network in accordance with some embodiments.

FIG. 1 is a functional diagram of a 3GPP network in accordance with some embodiments. The network comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes mobility management entity (MME) 122, serving gateway (serving GW) 124, and packet data network gateway (PDN GW) 126. The RAN 100 includes Evolved Node-B's (eNBs) 104 (which may operate as base stations) for communicating with UE 102. The eNBs 104 may include macro eNBs and low power (LP) eNBs. The UEs 102 may include Machine Type Communication (MTC) UEs, Mission-Critical MTC (MC-MTC) UEs, and non-MTC UEs, and the network 100 may include or support any number of such UEs 102. These types will be described in more detail below. In some embodiments, support of these different types of UEs 102 may be concurrent.

The MME is similar in function to the control plane of legacy Serving GPRS Support Nodes (SGSN). The MME manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 may be configured to communicate OFDM communication signals with an eNB 104 over a multicarrier communication channel in accordance with an OFDMA communication technique. The OFDM signals may comprise a plurality of orthogonal subcarriers.

In accordance with some embodiments, an eNB 104 may monitor transmission notification (TN) resources during a TN monitoring period for TN signals which may be from one or more MC-MTC UEs 102. In some embodiments, the TN signal from each MC-MTC UE 102 may indicate a transmission of one or more traffic signals by the MC-MTC UE 102 during a traffic period in dedicated MC-MTC traffic resources for the MC-MTC UE 102. These embodiments are described in more detail below. Some of these embodiments may provide for faster and more reliable network access for MC-MTC UEs 102.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller, and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB 104 to a UE 102, while uplink transmission from the UE 102 to the eNB 104 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements and in the frequency domain, this represents the smallest quanta of resources that currently can be allocated. There are several different physical downlink channels that are conveyed using such resource blocks.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE 102 about the transport format, resource allocation, and H-ARQ information related to the uplink shared channel. Typically, downlink scheduling (assigning control and shared channel resource blocks to UEs 102 within a cell) is performed at the eNB 104 based on channel quality information fed back from the UEs 102 to the eNB 104, and then the downlink resource assignment information is sent to a UE 102 on the control channel (PDCCH) used for (assigned to) the UE 102.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

Figure 2:
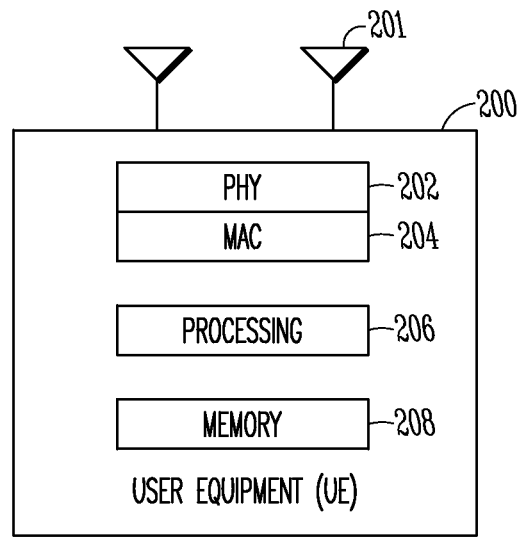
FIG. 2 is a functional diagram of a User Equipment (UE) in accordance with some embodiments.
Figure 3:
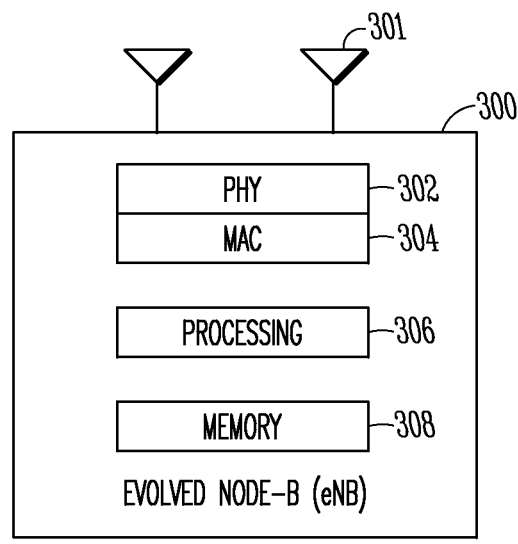
FIG. 3 is a functional diagram of an Evolved Node-B (eNB) in accordance with some embodiments.

FIG. 2 is a functional diagram of a User Equipment (UE) in accordance with some embodiments. FIG. 3 is a functional diagram of an Evolved Node-B (eNB) in accordance with some embodiments. It should be noted that in some embodiments, the eNB 300 may be a stationary non-mobile device. The UE 200 may be a UE 102 as depicted in FIG. 1, while the eNB 300 may be an eNB 104 as depicted in FIG. 1. The UE 200 may include physical layer circuitry 202 for transmitting and receiving signals to and from the eNB 300, other eNBs, other UEs or other devices using one or more antennas 201, while the eNB 300 may include physical layer circuitry 302 for transmitting and receiving signals to and from the UE 200, other eNBs, other UEs or other devices using one or more antennas 301. The UE 200 may also include medium access control layer (MAC) circuitry 204 for controlling access to the wireless medium, while the eNB 300 may also include medium access control layer (MAC) circuitry 304 for controlling access to the wireless medium. The UE 200 may also include processing circuitry 206 and memory 208 arranged to perform the operations described herein, and the eNB 300 may also include processing circuitry 306 and memory 308 arranged to perform the operations described herein.

In some embodiments, the UE 200 may be designed as or may operate or be configured to operate as a Machine Type Communication (MTC) UE or device, or may support MTC. MTC may include communication between devices that involves little or no human intervention or input. For instance, communication between sensors in a home or other environment may employ MTC. In some cases, MTC devices may be low-complexity or low-cost, but are not limited as such. For instance, an MTC device may have limited memory or processing power, which may result from a design effort to make the device low-cost. In addition, the UE 102 or other device may support both MTC and non-MTC communication in some cases, either simultaneously or separately.

In some embodiments, an MTC device may need or benefit from fast, reliable, and guaranteed network access for data transmission when it has data to send. Such devices may be referred to as Mission-Critical MTC (MC-MTC) devices, and the UE 200 may be designed as or may operate or be configured to operate as an MC-MTC UE or device, or may support MC-MTC. As an example, data from a pacemaker, vehicle accident sensor or other sensor may need to be made available (transmitted to another component) almost immediately. Those devices may be MC-MTC devices, may be part of MC-MTC devices or may be communicatively coupled to MC-MTC devices. As an example, an access time on the order of 10 milliseconds may be specified for MC-MTC devices. As another example, the access time may range from as little as 4 milliseconds or less to as great as 10 milliseconds or more. As another example, the access time specified for MC-MTC devices may be a value less than one millisecond (sub-millisecond range), such as 500 nanoseconds. Values in the sub-millisecond range may be specified in 5G or other standards, but are not limited as such. As another example, the access time may range from as little as 500 nanoseconds or less to as great as 10 milliseconds or more. These examples are not limiting, however. In some cases, the specified access time may depend on various considerations such as the nature or function of the MC-MTC device or system parameters such as transmission symbol period duration.

In contrast, an MTC device (not of the MC-MTC type) or other device in an idle mode may attempt to access the network using techniques such as scheduling requests or others that may included in 3GPP or other standards. The setup time involved in such techniques may be on the order of 100 milliseconds or more, and may even reach one second in some cases. These setup times are not in the range of the 10 milliseconds or other values previously described, and therefore the use of these techniques for MC-MTC devices may not be possible or practical.

In some embodiments, mobile devices or other devices described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the mobile device or other device can be a UE 102 or eNB 104 configured to operate in accordance with 3GPP standards. In some embodiments, the mobile device or other device may be configured to operate according to other protocols or standards, including IEEE 802.11 or other IEEE standards. In some embodiments, the mobile device or other device may include one or more of a keyboard, a display, a non-volatile memory port, multiple antennas, a graphics processor, an application processor, speakers, and other mobile device elements. The display may be an LCD screen including a touch screen.

The antennas 201, 301 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 201, 301 may be effectively separated to take advantage of spatial diversity and the different channel characteristics that may result.

Although the UE 200 and eNB 300 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

In accordance with embodiments, the eNB 104 may support Mission-Critical Machine Type Communication (MC-MTC) UEs 102. During a transmission notification (TN) monitoring period, the eNB 104 may monitor for TN signals from MC-MTC UEs 102. When a presence of TN signals is detected, the eNB may refrain from allocation of dedicated MC-MTC traffic resources to other UEs 102 for transmission during a traffic period. In response to a detection of an absence of TN signals from the first group of MC-MTC UEs during the TN monitoring period, the eNB 104 may allocate the dedicated MC-MTC traffic resources to the other UEs 102 for transmission during the traffic period. Starting times of the traffic period and the TN monitoring period may be spaced apart by a predetermined time difference. In some embodiments, the predetermined time difference may be not greater than 10 milliseconds. The threshold of 10 milliseconds, or another suitable threshold, may be relevant for or may be specified for MC-MTC UEs 102. These embodiments are described in more detail below.

Figure 4:
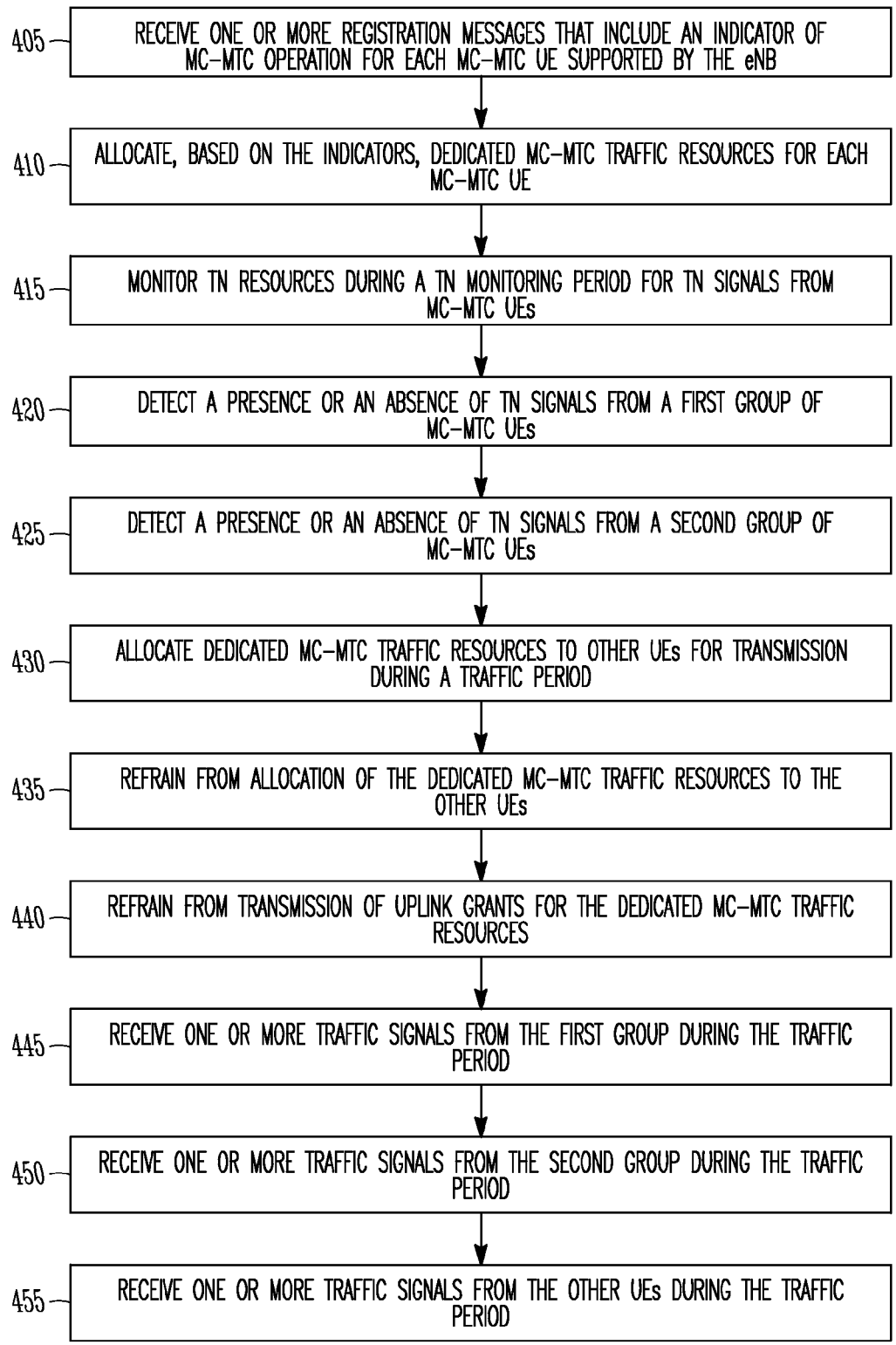
FIG. 4 illustrates the operation of a method for supporting Mission-Critical Machine Type Communication (MC-MTC) UEs in accordance with some embodiments.

FIG. 4 illustrates the operation of a method for supporting Mission-Critical Machine Type Communication (MC-MTC) UEs in accordance with some embodiments. It is important to note that embodiments of the method 400 may include additional or even fewer operations or processes in comparison to what is illustrated in FIG. 4. In addition, embodiments of the method 400 are not necessarily limited to the chronological order that is shown in FIG. 4. In describing the method 400, reference may be made to FIGS. 1-3 and 5-6, although it is understood that the method 400 may be practiced with any other suitable systems, interfaces and components.

In addition, while the method 400 and other methods described herein may refer to eNBs 104 or UEs 102 operating in accordance with 3GPP or other standards, embodiments of those methods are not limited to just those eNBs 104 or UEs 102 and may also be practiced on other mobile devices, such as a Wi-Fi access point (AP) or user station (STA). Moreover, the method 400 and other methods described herein may be practiced by wireless devices configured to operate in other suitable types of wireless communication systems, including systems configured to operate according to various IEEE standards such as IEEE 802.11.

At operation 405 of the method 400, the eNB 104 may receive one or more registration messages that include an indicator of MC-MTC operation for each MC-MTC UE 102 supported by the eNB. In some embodiments, each MC-MTC UE 102 may exchange one or more messages with the eNB 104 as part of registration or other process. In some embodiments, one or more registration or other messages may be transmitted by another component, and may be performed on behalf of one or more MC-MTC UEs 102. For instance, a controller component may register a group of MC-MTC UEs 102. In any case, the messages described above may include an indication that the MC-MTC UE 102 is an MC-MTC UE 102 or is configured for MC-MTC operation, and the eNB 104 may learn that information as a result of the messages.

At operation 410, the eNB 104 may allocate dedicated MC-MTC traffic resources for each MC-MTC UE 102 during each of multiple time periods. The allocation may be performed at least partly based on or in response to the indicators of MC-MTC operation. The dedicated resources, once allocated, may include the same frequency, time, and code resources (which will be explained below) during each traffic period, in some embodiments. Such a predetermined or fixed arrangement may provide fast and guaranteed access to the network for the MC-MTC UE 102, which may be especially beneficial for MC-MTC UEs 102 as described earlier.

The allocation of the dedicated MC-MTC traffic resources for each MC-MTC UE 102 may be semi-permanent or semi-static. The allocation may be for a number of consecutive traffic periods or other periods or duration. Accordingly, the allocation may span a period of time on the order of seconds, minutes, days or even longer. That is, the dedicated MC-MTC traffic resources allocated to an MC-MTC UE 102 may be allocated for an indefinite and continuous time period, in some cases. In some embodiments, the resources may be allocated for a continuous period of time until the eNB 104 is notified that the resources are not needed. For instance, a deregistration process or other process may include transmission of one or more messages to the eNB 104 that includes that information or similar.

The dedicated MC-MTC traffic resources may include frequency resources that include any suitable number of Resource Elements (REs), Resource Blocks (RBs) or subcarriers, or may be any contiguous or non-contiguous frequency block of any suitable size. The dedicated MC-MTC traffic resources may include time resources that include any suitable number of sub-frames, symbol intervals, transmission time intervals (TTIs), OFDM symbol periods or other suitable time intervals. As an example, the time resources may be specified by the parameter "T_reuse" which may be designed based on MC-MTC latency constraints described earlier and TTI durations of 5G or 3GPP or other standards. In some embodiments, the dedicated MC-MTC traffic resources may also include a code sequence, which will be explained in more detail below. These embodiments are not limiting, however, as some embodiments of dedicated MC-MTC traffic resources may exclude code sequences.

At operation 415, the eNB 104 may monitor transmission notification (TN) resources for TN signals from MC-MTC UEs 102 during a TN monitoring period. In some embodiments, the TN signal for each MC-MTC UE 102 may indicate a transmission of one or more traffic signals by the MC-MTC UE 102 during a traffic period in the dedicated MC-MTC traffic resources for the MC-MTC UE 102. That is, when an MC-MTC UE 102 has traffic data for transmission during a future traffic period, it may notify the eNB 104 to retain, or to not release, the dedicated MC-MTC traffic resources by transmitting the TN signal in shared dedicated TN resources. In some embodiments, starting times of the traffic period and the TN monitoring period may be spaced apart by a predetermined time difference that may be known by the eNB 104 and by the MC-MTC UEs 102. In some embodiments, the predetermined time difference for MC-MTC UEs 102 may be not greater than 10 milliseconds. Accordingly, the MC-MTC UEs 102 may be provided with fast access to the network for transmission of mission-critical data. The value of 10 milliseconds for the time difference is not limiting, however, as any suitable time value may be used, including values and ranges previously described. In some embodiments, the time difference may be 1, 2, 5, 15, 20 or 50 milliseconds or another value within that range. In some embodiments, the time difference may be a value less than 1 millisecond. In some embodiments, the time difference may be a value greater than 50 milliseconds.

In some embodiments, the TN resources may be restricted for transmission of TN signals by the MC-MTC UEs 102. That is, the TN resources may be restricted such that they are not allocated to "regular" UEs 102, which may be UEs 102 not configured for MC-MTC operation or not operating in such a mode. As an example, the TN resources may include dedicated frequency, time, and TN code resources. Accordingly, the frequency resources may include any suitable number of REs, RBs or subcarriers, or may be any contiguous or non-contiguous frequency block of any suitable size. For example, 6 RBs (which spans 1.4 MHz) may be allocated. In addition, the time resources may include any suitable number of sub-frames, symbol intervals, OFDM symbol periods or other suitable time intervals. The time resources may correspond to, or may be included in, the TN monitoring period.

In general, usage of two code sequences by two different UEs 102 (of the MC-MTC type or any type) may enable the two UEs 102 to utilize the same time and frequency resources. As an example, signals for each of the two UEs 102 may be multiplied by the respective code before transmission. The resulting signals may be separated at the receiver due to orthogonality of the two code sequences. As an example, Zadoff-Chu sequences may be used, including versions that may be part of 3GPP or other standards.

In some embodiments, the allocated TN code resources for all MC-MTC UEs 102 supported by the eNB 104 may include a TN code sequence and the TN signals transmitted by the MC-MTC UEs 102 may be based at least partly on the TN code sequence. The TN code sequence may be selected from a group of candidate code sequences that may exhibit orthogonality or good cross-correlation properties. In some embodiments, the group of candidate code sequences may be used for other purposes like physical random access channel (PRACH) preamble transmission, although these embodiments are not limiting. As an example, 64 codes may be available for PRACH preamble transmission, and one of the 64 may be selected for exclusive use as the TN code, leaving 63 for PRACH preamble transmission. As another example, an additional code may be selected or designed for use as the TN code, while the 64 PRACH preamble codes remain available for PRACH preamble transmission.

In some embodiments, multiple TN codes may be employed for the MC-MTC UEs 102 supported by the eNB 104. As an example, a first TN code may be assigned to a first group of one or more MC-MTC UEs 102 and a second TN code may be assigned to a second, different group of one or more MC-MTC UEs 102. The first and second TN codes may exhibit orthogonality as described above, and may be selected from a group of candidate code sequences as previously described. As such, the first and second groups may be able to utilize the same frequency resources and time resources for TN transmission. That is, the TN resources for the first group and the TN resources for the second group may include the same (or overlapping) frequency resources and time resources but may include different TN code resources.

As another example, TN resources for a group of MC-MTC UEs 102 may include dedicated frequency and time resources for the TN signals and TN resources for each MC-MTC UE 102 in the group may include a TN code sequence different from TN code sequences for the other MC-MTC UEs 102 in the group. Accordingly, each MC-MTC UE 102 in the group may have its own unique TN code sequence. The TN signal from each MC-MTC UE 102 may be at least partly based on the TN code sequence included in the TN resources for the MC-MTC UE 102, and the TN signals transmitted by each MC-MTC UE 102 may exhibit a level of orthogonality to each other as a result. Therefore, in some cases, the eNB 104 may be able to determine which MC-MTC UEs 102 have transmitted TN signals and may be able to make decisions regarding reallocation of dedicated traffic resources for individual MC-MTC UEs 102 in the group.

It should be noted that TN resources are not limited to these embodiments, as other suitable TN codes may be used in addition to or instead of those described above. In addition, any number of groups of MC-MTC UEs 102 may be used, and TN resources for each group may be different in any or all of the frequency resources, time resources or TN code resources used.

As described above, the TN resources may include frequency, time, and TN code resources, and monitoring of the TN resources for TN signals may include demodulation or other detection techniques for those TN resources. As an example, the TN signal may be an OFDM signal that occupies a group of REs or RBs during a group of sub-frames. A Fast Fourier Transform (FFT) may be performed on the received time signal during each sub-frame, and the FFT values for the REs or RBs occupied by the TN signal may be used. In some embodiments, detection of a presence of TN signals may include a determination that a detected energy level for the TN resources during the TN monitoring period is greater than a first TN monitoring energy threshold. In some embodiments, detection of an absence of TN signals may include a determination that the detected energy level is not greater than a second TN monitoring energy threshold. In some embodiments, the first and second TN monitoring energy thresholds may be equivalent.

As an example, the detected energy level may include or be related to magnitudes of FFT values for the REs or RBs included in the frequency resources. As another example, the detected energy level may include or be related to a correlation value formed by correlation of a received time signal with a predetermined template. As another example, when the TN resources include a TN code, the detection may include additional operations, such as multiplication of a received time signal by the TN code or a modified version of it (such as a complex conjugate). These examples are not limiting, however, and the detected energy level may be performed using other suitable techniques. The TN monitoring energy threshold may be an absolute value, normalized value or similar which may be predetermined through simulation, analysis or other techniques.

It should be pointed out that multiple MC-MTC UEs 102 may send the same TN signal in the same TN resources in some cases. Although such cases may be considered collisions, the eNB 104 may still be able to determine that at least one MC-MTC UE 102 has transmitted a TN signal. As an example, the energy detection techniques described may simply detect a presence or absence of one or more TN signals without actually knowing how many TN signals have been transmitted (and therefore how many MC-MTC UEs 102 have transmitted signals and have traffic data to send during the future traffic period).

As will be described below, the eNB 104 may retain all dedicated MC-MTC traffic resources for the multiple MC-MTC UEs 102 for the corresponding traffic period. The presence or absence of at least one TN signal may serve as a "yes/no" or similar indicator that at least some of the MC-MTC UEs 102 have traffic to send during the traffic period. In some cases, all dedicated traffic resources for the traffic period may be retained even though some of the MC-MTC UEs 102 will not use their dedicated resources. However, the ability of the eNB 104 to allocate the traffic resources in cases when none of the MC-MTC UEs 102 have traffic data to send may be beneficial, especially in light of the low frequency of traffic transmission for the MC-MTC UEs 102.

Figure 5:
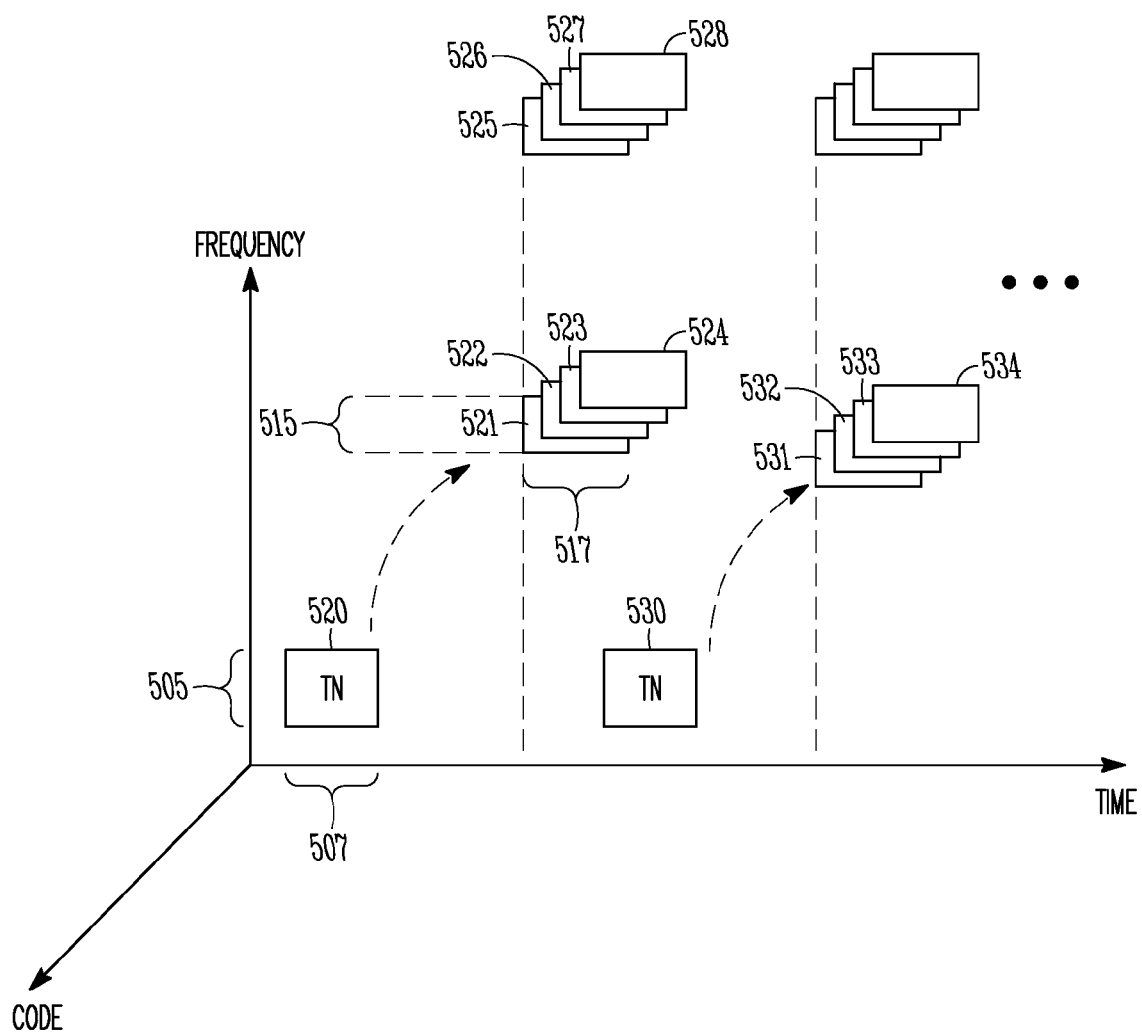
FIG. 5 illustrates an example of resource allocation that may support MC-MTC operation in accordance with some embodiments.

FIG. 5 illustrates an example of resource allocation that may support MC-MTC operation in accordance with some embodiments. Accordingly, a non-limiting example of resource allocation for TN resources and traffic resources is shown in FIG. 5. In TN resources that include the frequency resources 505 and time resources 507, a TN signal 520 may be transmitted by one or more MC-MTC UEs 102. In the example shown, the TN resources include only a single code, but this is not limiting. The TN signal 520 may indicate transmission of traffic data in dedicated traffic resources that include time resources 517 and frequency resources 515. The time resources 517 may be of a duration that corresponds to the parameter "T_reuse" mentioned earlier. The traffic resources may also include multiple codes (four in this case) as illustrated by the boxes 521-524. In some embodiments, each code may be allocated as part of traffic resources for each of four different MC-MTC UEs 102. Another TN signal 530 may indicate transmission of traffic in dedicated traffic resources shown in boxes 531-534. The example in FIG. 5 serves to illustrate concepts but is not limiting in terms of the number or size of TN resources or traffic resources used.

Returning to the method 400, at operation 420, a presence or an absence of one or more TN signals from a first group of MC-MTC UEs 102 may be detected during a TN monitoring period. As previously described, TN resources for the first group of MC-MTC UEs 102 may include dedicated time resources, frequency resources, and a first TN code sequence. The TN signals from the first group may be at least partly based on the first TN code sequence and may be transmitted by one or more of the MC-MTC UEs 102 in the first group in the dedicated time and frequency resources. In addition, monitoring the TN resources for TN signals from the first group of MC-MTC UEs 102 may include previously described energy detection or other techniques.

At operation 425, a presence or an absence of one or more TN signals from a second, different group of MC-MTC UEs 102 may be detected during a TN monitoring period. As previously described, TN resources for the second group of MC-MTC UEs 102 may include dedicated time resources, frequency resources, and a second TN code sequence different from the first TN code sequence. In some embodiments, the dedicated time and frequency resources for the first and second groups may be the same (or overlapping) while the first and second TN code sequences may be different. The TN signals from the second group may be at least partly based on the second TN code sequence and may be transmitted by one or more of the MC-MTC UEs 102 in the second group in the dedicated time and frequency resources. In addition, monitoring the TN resources for TN signals from the second group of MC-MTC UEs 102 may include previously described energy detection or other techniques.

At operation 430, dedicated MC-MTC traffic resources may be allocated to other UEs 102 for transmission during a traffic period while at operation 435, the eNB 104 may refrain from allocation of the dedicated MC-MTC traffic resources to the other UEs 102. At operation 440, the eNB 104 may refrain from transmission of uplink grants for the dedicated MC-MTC traffic resources for the traffic period. These operations may be employed for the previously described first and second groups of MC-MTC UEs 102, which may each have allocated TN resources. In addition, each MC-MTC UE 102 in each group may have dedicated MC-MTC traffic resources for the traffic period.

Accordingly, when a presence of one or more TN signals from the first group of MC-MTC UEs 102 is detected during the TN monitoring period, the eNB 104 may refrain from allocation of dedicated MC-MTC traffic resources for the first group to other UEs 102 for transmission during the traffic period. As the MC-MTC traffic resources may be known ahead of time by the MC-MTC UEs 102 in the first group, it may be unnecessary to transmit uplink grants for those resources, and the eNB 104 may refrain from doing so.

In response to a detection of an absence of TN signals from the first group of MC-MTC UEs 102 during the TN monitoring period, the eNB 104 may allocate the dedicated MC-MTC traffic resources for the first group to the other UEs 102 for transmission during the traffic period. In some embodiments, the eNB 104 may allocate traffic resources for transmission during the traffic period by a UE 102 excluded from the first group, and the traffic resources may include at least a portion of the dedicated MC-MTC traffic resources for the first group. In addition, the allocation of the dedicated MC-MTC traffic resources to the other UEs 102 may be included as part of a transmission of one or more uplink grants for the traffic period to the other UEs 102.

It should be noted that, in some embodiments, allocation of dedicated MC-MTC traffic resources may not necessarily occur for all traffic periods for which an absence of TN signals is detected during the corresponding TN monitoring periods. That is, the eNB 104 may have the option to reallocate traffic resources during some of those traffic periods, but may sometimes choose not to do so. For instance, demand for throughput at a certain time may be below the available throughput of the system, and the eNB 104 may deem the reallocation unnecessary.

Similarly for the second group of MC-MTC UEs 102, when a presence of one or more TN signals from the second group of MC-MTC UEs 102 is detected during the TN monitoring period, the eNB 104 may refrain from allocation of dedicated MC-MTC traffic resources for the second group to the other UEs 102 for transmission during the traffic period and may refrain from transmission of related uplink grants. In response to a detection of an absence of TN signals from the second group of MC-MTC UEs 102 during the TN monitoring period, the eNB 104 may allocate the dedicated MC-MTC traffic resources for the second group to the other UEs 102 for transmission during the traffic period. In addition, the allocation of the dedicated MC-MTC traffic resources to the other UEs 102 may be included as part of a transmission of one or more uplink grants for the traffic period to the other UEs 102.

It should be noted that embodiments are not limited to a first group or to a first and second group, as any suitable number of groups may be used. In addition, some groups may not necessarily include multiple MC-MTC UEs 102. As an example, each MC-MTC UE 102 supported by the eNB 104 may be a group (with one member) and may have different dedicated TN resources. Therefore, the eNB 104 may be able to identify which MC-MTC UE 102 has transmitted a TN signal, and may be able to reallocate the dedicated traffic resources of the MC-MTC UEs 102 that do not have data to transmit. Such an arrangement may further improve upon the previously described scenario in which the eNB 104 retains all dedicated traffic resources when at least one of the MC-MTC UEs 102 has data to transmit during the traffic period.

At operation 445, one or more traffic signals from the first group of MC-MTC UEs 102 may be received during the traffic period. At operation 450, one or more traffic signals from the second group of MC-MTC UEs 102 may be received during the traffic period. At operation 455, one or more traffic signals may be received from the other UEs 102 during the traffic period.

When the presence of one or more TN signals from the first group of MC-MTC UEs 102 is detected during the TN monitoring period, the eNB 104 may receive one or more traffic signals from the first group on the dedicated MC-MTC traffic resources for the first group during the traffic period. The dedicated MC-MTC traffic resources for the first group may include dedicated MC-MTC traffic resources for each MC-MTC UE 102 in the first group. As previously described, the reception may include reception on dedicated traffic resources for each of at least one of the MC-MTC UEs 102 in the first group. That is, some or all of the MC-MTC UEs 102 in the first group may transmit traffic signals during the traffic period. In some cases, such as the previous scenario in which the TN signals serve as a "yes/no" indicator that at least one MC-MTC UE 102 has traffic data to send, only a single MC-MTC UE 102 of the first group may transmit traffic data during the traffic period. In response to the detection of the absence of TN signals from the first group of MC-MTC UEs 102 during the TN monitoring period, the eNB 104 may receive one or more traffic signals from the other UEs 102 during the traffic period. As described previously, the eNB 104 may sometimes choose to not reallocate dedicated traffic resources to the other UEs 102 even when an absence of TN signals is detected during the corresponding TN monitoring period. Accordingly, reception of traffic signals from the other UEs 102 during some of the traffic periods may or may not occur.

Figure 6:
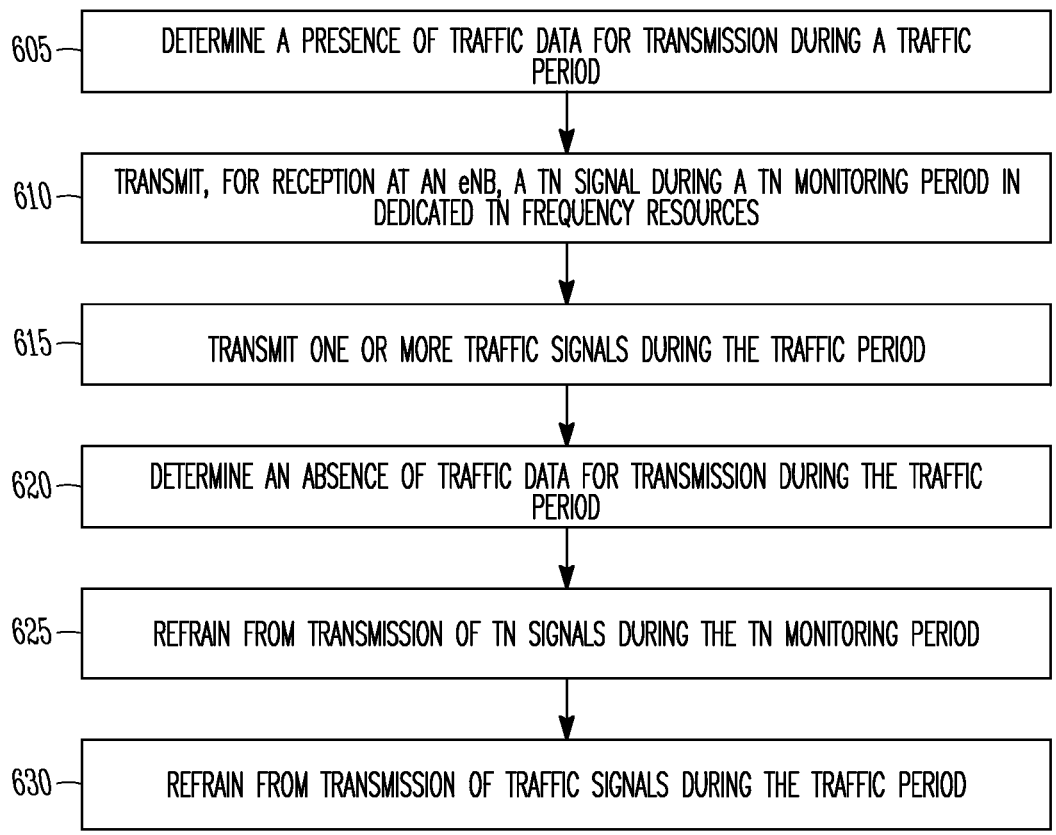
FIG. 6 illustrates the operation of a method for MC-MTC operation in accordance with some embodiments.

FIG. 6 illustrates the operation of a method for MC-MTC operation in accordance with some embodiments. As mentioned previously regarding the method 400, embodiments of the method 600 may include additional or even fewer operations or processes in comparison to what is illustrated in FIG. 6 and embodiments of the method 600 are not necessarily limited to the chronological order that is shown in FIG. 6. In describing the method 600, reference may be made to FIGS. 1-5, although it is understood that the method 600 may be practiced with any other suitable systems, interfaces and components. In addition, embodiments of the method 600 may refer to eNBs 104, UEs 102, APs, STAs or other wireless or mobile devices.

It should be pointed out that the method 600 may be practiced at an MC-MTC UE 102 while the method 400 may be practiced at an eNB 104. Some of the operations in each method 400, 600 may be similar to or related to operations in the other. Accordingly, some or all of the discussion of techniques and operations for each method 400, 600 may apply to the other method in some cases.

At operation 605, a presence of traffic data for transmission during a traffic period may be determined at the MC-MTC UE 102. The determination may be performed using any suitable technique, and may include the use of input data from sensors or other components communicatively coupled to the MC-MTC UE 102. For instance, a vehicle accident avoidance sensor may provide an indication of traffic data to the MC-MTC UE 102.

At operation 610, a TN signal may be transmitted for reception at the eNB 104. In some embodiments, the transmission may be performed in response to the determination of the presence of traffic data. The TN signal may be transmitted during a TN monitoring period in TN resources that are restricted for transmission of TN signals by MC-MTC UEs 102, as described earlier. The TN resources may include frequency resources and time resources, and may also include TN code resources. The TN signal may be based at least partly on a first TN code sequence dedicated for a group of MC-MTC UEs 102 that includes the MC-MTC UE 102.

The TN signal may indicate that the MC-MTC UE 102 has traffic data to send during the traffic period, and a predetermined time difference between starting times of the traffic period and the TN monitoring period may be known at the MC-MTC UE 102 and the eNB 104. The predetermined time difference for MC-MTC UEs 102 may be not greater than 10 milliseconds in some embodiments. These embodiments are not limiting, however, as the time difference may also be in the range of values described earlier regarding the method 400.

At operation 615, one or more traffic signals based at least partly on the traffic data may be transmitted during the traffic period. As an example, the traffic data for transmission may be sent during a single traffic period or may be spread over multiple traffic periods.

At operation 620, an absence of traffic data for transmission during the traffic period may be determined at the MC-MTC UE 102, which may be performed in a similar manner to the determination of the presence of traffic data for transmission described at operation 605. At operation 625, the MC-MTC UE 102 may refrain from transmission of TN signals during the TN monitoring period and may refrain from transmission of traffic signals during the traffic period at operation 630. These operations may be performed in response to the determination of the absence of traffic data, in some embodiments.

An Evolved Node-B (eNB) to support Mission-Critical Machine Type Communication (MC-MTC) User Equipments (UEs) is disclosed herein. The eNB may include hardware processing circuitry configured to, during a transmission notification (TN) monitoring period, monitor TN resources for TN signals from MC-MTC UEs. In some embodiments, the TN resources may be restricted for transmission of TN signals by the MC-MTC UEs. The hardware processing circuitry may be further configured to, when a presence of one or more TN signals from a first group of one or more MC-MTC UEs is detected during the TN monitoring period, refrain from allocation of dedicated MC-MTC traffic resources for the first group to other UEs for transmission during a traffic period. The hardware processing circuitry may be further configured to, in response to a detection of an absence of TN signals from the first group of MC-MTC UEs during the TN monitoring period, allocate the dedicated MC-MTC traffic resources for the first group to the other UEs for transmission during the traffic period.

In some embodiments, starting times of the traffic period and the TN monitoring period may be spaced apart by a predetermined time difference. In some embodiments, the predetermined time difference may be not greater than 10 milliseconds. In some embodiments, the dedicated MC-MTC traffic resources for the first group may include dedicated MC-MTC traffic resources for each MC-MTC UE in the first group and the TN signal for each MC-MTC UE may indicate a transmission of one or more traffic signals by the MC-MTC UE during the traffic period in the dedicated MC-MTC traffic resources for the MC-MTC UE. The hardware processing circuitry may be further configured to receive one or more registration messages that include an indicator of MC-MTC operation for each MC-MTC UE supported by the eNB and allocate, based on the indicators, dedicated MC-MTC traffic resources for each MC-MTC UE during each of multiple consecutive traffic periods.

In some embodiments, the TN resources may include dedicated frequency and time resources for the TN signals and a first TN code sequence and the TN signals from the first group may be at least partly based on the first TN code sequence. The hardware processing circuitry may be further configured to, when a presence of one or more TN signals from a second, different group of one or more MC-MTC UEs is detected during the TN monitoring period, refrain from allocation of dedicated MC-MTC traffic resources for the second group to the other UEs for transmission during the traffic period. The hardware processing circuitry may be further configured to, in response to a detection of an absence of TN signals from the second group of MC-MTC UEs during the TN monitoring period, allocate the dedicated MC-MTC traffic resources for the second group to the other UEs for transmission during the traffic period. In some embodiments, the TN resources may include dedicated frequency and time resources for the TN signals, a first TN code sequence, and a second TN code sequence different from the first TN code sequence. In some embodiments, the TN signals from the first group may be at least partly based on the first TN code sequence and the TN signals from the second group may be at least partly based on the second TN code sequence.

In some embodiments, the TN resources may include dedicated frequency and time resources for the TN signals and the TN resources for each MC-MTC UE in the first group may include a TN code sequence different from TN code sequences for the other MC-MTC UEs in the first group. The TN signal from each MC-MTC UE may be at least partly based on the TN code sequence included in the TN resources for the MC-MTC UE. The hardware processing circuitry may be further configured to, when the presence of one or more TN signals from the first group of MC-MTC UEs is detected during the TN monitoring period, receive one or more traffic signals from the first group on the dedicated MC-MTC traffic resources for the first group during the traffic period. The hardware processing circuitry may be further configured to, further in response to the detection of the absence of TN signals from the first group of MC-MTC UEs during the TN monitoring period, receive one or more traffic signals from the other UEs on the dedicated MC-MTC traffic resources for the first group during the traffic period. In some embodiments, the reception of one or more traffic signals from the first group may include reception on dedicated traffic resources for each of at least one of the MC-MTC UEs in the first group. The hardware processing circuitry may be further configured to, in response to the detection of the absence of TN signals from the first group of MC-MTC UEs during the TN monitoring period, allocate traffic resources for transmission during the traffic period by a UE excluded from the first group, the traffic resources including at least a portion of the dedicated MC-MTC traffic resources for the first group.

In some embodiments, the detection of the presence of TN signals may include a determination that a detected energy level for the dedicated TN resources during the TN monitoring period is greater than a first TN monitoring energy threshold and the detection of the absence of TN signals may include a determination that the detected energy level is not greater than a second TN monitoring energy threshold. In some embodiments, the first and second TN monitoring energy thresholds may be equivalent. In some embodiments, the allocation of the dedicated MC-MTC traffic resources to the other UEs may be included as part of a transmission of one or more uplink grants for the traffic period to the other UEs. The hardware processing circuitry may be further configured to, when the presence of TN signals from the first group is detected during the TN monitoring period, refrain from transmission of uplink grants for the dedicated MC-MTC traffic resources for the traffic period.

A non-transitory computer-readable storage medium that stores instructions for execution by one or more processors to perform operations for support of Mission-Critical Machine Type Communication (MC-MTC) User Equipments (UEs) is also disclosed herein. The operations may configure the one or more processors to, during a transmission notification (TN) monitoring period, monitor TN resources for TN signals from MC-MTC UEs. In some embodiments, the TN resources may be restricted for transmission of TN signals by the MC-MTC UEs. The operations may configure the one or more processors to, when a presence of one or more TN signals from a first group of MC-MTC UEs is detected during the TN monitoring period, refrain from allocation of dedicated MC-MTC traffic resources for the first group to other UEs for transmission during a traffic period. The operations may configure the one or more processors to, in response to a detection of an absence of TN signals from the first group of MC-MTC UEs during the TN monitoring period, allocate the dedicated MC-MTC traffic resources for the first group to the other UEs for transmission during the traffic period. In some embodiments, starting times of the traffic period and the TN monitoring period may be spaced apart by a predetermined time difference and the predetermined time difference may be not greater than 10 milliseconds. In some embodiments, the dedicated MC-MTC traffic resources for the first group may include dedicated MC-MTC traffic resources for each MC-MTC UE in the first group. In some embodiments, the TN signal for each MC-MTC UE may indicate a transmission of one or more traffic signals by the MC-MTC UE during the traffic period in the dedicated MC-MTC traffic resources for the MC-MTC UE.

A method of supporting of Mission-Critical Machine Type Communication (MC-MTC) User Equipments (UEs) is also disclosed herein. The method may include, during a transmission notification (TN) monitoring period, monitoring TN resources for TN signals from MC-MTC UEs. In some embodiments, the TN resources may be restricted for transmission of TN signals by the MC-MTC UEs. The method may further include, when a presence of one or more TN signals from a first group of MC-MTC UEs is detected during the TN monitoring period, refraining from allocation of dedicated MC-MTC traffic resources for the first group to other UEs for transmission during a traffic period. The method may further include, in response to a detection of an absence of TN signals from the first group of MC-MTC UEs during the TN monitoring period, allocating the dedicated MC-MTC traffic resources for the first group to the other UEs for transmission during the traffic period. In some embodiments, starting times of the traffic period and the TN monitoring period may be spaced apart by a predetermined time difference and the predetermined time difference may be not greater than 10 milliseconds. In some embodiments, the dedicated MC-MTC traffic resources for the first group may include dedicated MC-MTC traffic resources for each MC-MTC UE in the first group. In some embodiments, the TN signal for each MC-MTC UE may indicate a transmission of one or more traffic signals by the MC-MTC UE during the traffic period in the dedicated MC-MTC traffic resources for the MC-MTC UE.

A Mission-Critical Machine Type Communication (MC-MTC) User Equipment (UE) is also disclosed herein. The MC-MTC UE may include hardware processing circuitry configured to determine a presence of traffic data for transmission during a traffic period. The hardware processing circuitry may be further configured to, in response to the determination of the presence of traffic data, transmit, for reception at an Evolved Node-B (eNB), a transmission notification (TN) signal during a TN monitoring period in TN resources. In some embodiments, the TN resources may be restricted for transmission of TN signals by MC-MTC UEs. The hardware processing circuitry may be further configured to transmit, during the traffic period, one or more traffic signals based at least partly on the traffic data. In some embodiments, starting times of the traffic period and the TN monitoring period may be spaced apart by a predetermined time difference and the predetermined time difference may be not greater than 10 milliseconds.

In some embodiments, the TN signal may be based at least partly on a first TN code sequence dedicated for a group of MC-MTC UEs that includes the MC-MTC UE. The hardware processing circuitry may be further configured to determine an absence of traffic data for transmission during the traffic period and, in response to the determination of the absence, refrain from transmission of TN signals during the TN monitoring period and refrain from transmission of traffic signals during the traffic period.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An Evolved Node-B (eNB) to support Mission-Critical Machine Type Communication (MC-MTC) User Equipments (UEs), the eNB comprising hardware processing circuitry configured to:
   during a transmission notification (TN) monitoring period, monitor TN resources for TN signals from MC-MTC UEs, wherein the TN resources are restricted for transmission of TN signals;
   when a presence of one or more TN signals from a first group of one or more MC-MTC UEs is detected during the TN monitoring period, refrain from allocation of dedicated MC-MTC traffic resources, within the TN resources, for the first group to other UEs for transmission during a traffic period; and
   when TN signals from the first group of MC-MTC UEs are not detected during the TN monitoring period, allocate the dedicated MC-MTC traffic resources for the first group to the other UEs for transmission during the traffic period.

2. The eNB according to claim 1, wherein:
   starting times of the traffic period and the TN monitoring period are spaced apart by a predetermined time difference; and
   the predetermined time difference is not greater than 10 milliseconds.

3. The eNB according to claim 1, wherein:
   the dedicated MC-MTC traffic resources for the first group include dedicated MC-MTC traffic resources for each MC-MTC UE in the first group; and the TN signal for each MC-MTC UE indicates a transmission of one or more traffic signals by the MC-MTC UE during the traffic period in the dedicated MC-MTC traffic resources for the MC-MTC UE.

4. The eNB according to claim 1, the hardware processing circuitry further configured to:
receive one or more registration messages that include an indicator of MC-MTC operation for each MC-MTC UE supported by the eNB; and
allocate, based on the indicators, dedicated MC-MTC traffic resources for each MC-MTC UE during each of multiple consecutive traffic periods.

5. The eNB according to claim 1, wherein:
the TN resources include dedicated frequency and time resources for the TN signals and a first TN code sequence; and
the TN signals from the first group are at least partly based on the first TN code sequence.

6. The eNB according to claim 1, the hardware processing circuitry further configured to:
when a presence of one or more TN signals from a second, different group of one or more MC-MTC UEs is detected during the TN monitoring period, refrain from allocation of dedicated MC-MTC traffic resources for the second group to the other UEs for transmission during the traffic period; and
in response to a detection of an absence of TN signals from the second group of MC-MTC UEs during the TN monitoring period, allocate the dedicated MC-MTC traffic resources for the second group to the other UEs for transmission during the traffic period.

7. The eNB according to claim 6, wherein:
the TN resources include dedicated frequency and time resources for the TN signals, a first TN code sequence, and a second TN code sequence different from the first TN code sequence; and
the TN signals from the first group are at least partly based on the first TN code sequence and the TN signals from the second group are at least partly based on the second TN code sequence.

8. The eNB according to claim 1, wherein:
the TN resources include dedicated frequency and time resources for the TN signals;
the TN resources for each MC-MTC UE in the first group include a TN code sequence different from TN code sequences for the other MC-MTC UEs in the first group; and
the TN signal from each MC-MTC UE is at least partly based on the TN code sequence included in the TN resources for the MC-MTC UE.

9. The eNB according to claim 1, the hardware processing circuitry further configured to:
when the presence of one or more TN signals from the first group of MC-MTC UEs is detected during the TN monitoring period, receive one or more traffic signals from the first group on the dedicated MC-MTC traffic resources for the first group during the traffic period; and
further in response to the detection of the absence of TN signals from the first group of MC-MTC UEs during the TN monitoring period, receive one or more traffic signals from the other UEs on the dedicated MC-MTC traffic resources for the first group during the traffic period.

10. The eNB according to claim 1, the hardware processing circuitry further configured to, in response to the detection of the absence of TN signals from the first group of MC-MTC UEs during the TN monitoring period, allocate traffic resources for transmission during the traffic period by a UE excluded from the first group, the traffic resources including at least a portion of the dedicated MC-MTC traffic resources for the first group.

11. The eNB according to claim 1, wherein:
the detection of the presence of TN signals includes a determination that a detected energy level for the dedicated TN resources during the TN monitoring period is greater than a first TN monitoring energy threshold; and
the detection of the absence of TN signals includes a determination that the detected energy level is not greater than a second TN monitoring energy threshold.

12. The eNB according to claim 11, wherein the first and second TN monitoring energy thresholds are equivalent.

13. The eNB according to claim 1, wherein the allocation of the dedicated MC-MTC traffic resources to the other UEs is included as part of a transmission of one or more uplink grants for the traffic period to the other UEs.

14. The eNB according to claim 1, the hardware processing circuitry further configured to, when the presence of TN signals from the first group is detected during the TN monitoring period, refrain from transmission of uplink grants for the dedicated MC-MTC traffic resources for the traffic period.

15. A non-transitory computer-readable storage medium that stores instructions for execution by one or more processors to perform operations for support of Misson-Critical Machine Type Communication (MC-MTC) User Equipments (UEs), the operations to configure the one or more processors to:
during a transmission notification (TN) monitoring period, monitor TN resources for TN signals from MC-MTC UEs, wherein the TN resources are restricted for transmission of TN signals;
when a presence of one or more TN signals from a first group of one or more MC-MTC UEs is detected during the TN monitoring period, refrain from allocation of dedicated MC-MTC traffic resources, within the TN resources, for the first group to other UEs for transmission during a traffic period; and
when TN signals from the first group of MC-MTC UEs are not detected during the TN monitoring period, allocate the dedicated MC-MTC traffic resources for the first group to the other UEs for transmission during the traffic period.

16. The non-transitory computer-readable storage medium according to claim 15, wherein:
starting times of the traffic period and the TN monitoring period are spaced apart by a predetermined time difference; and
the predetermined time difference is not greater than 10 milliseconds.

17. The non-transitory computer-readable storage medium according to claim 15, wherein:
the dedicated MC-MTC traffic resources for the first group include dedicated MC-MTC traffic resources for each MC-MTC UE in the first group; and
the TN signal for each MC-MTC UE indicates a transmission of one or more traffic signals by the MC-MTC UE during the traffic period in the dedicated MC-MTC traffic resources for the MC-MTC UE.

18. A method of supporting of Mission-Critical Machine Type Communication (MC-MTC) User Equipments (UEs), comprising:

during a transmission notification (TN) monitoring period, monitoring TN resources for TN signals from MC-MTC UEs, the TN resources being restricted for transmission of TN signals;

when a presence of one or more TN signals from a first group of one or more MC-MTC UEs is detected during the TN monitoring period, refraining from allocation of dedicated MC-MTC traffic resources, within the TN resources, for the first group to other UEs for transmission during a traffic period; and when TN signals from the first group of MC-MTC UEs are not detected during the TN monitoring period, allocating the dedicated MC-MTC traffic resources for the first group to the other UEs for transmission during the traffic period.

19. The method according to claim 18, wherein:

starting times of the traffic period and the TN monitoring period are spaced apart by a predetermined time difference; and the predetermined time difference is not greater than 10 milliseconds.

20. The method according to claim 18, wherein:

the dedicated MC-MTC traffic resources for the first group include dedicated MC-MTC traffic resources for each MC-MTC UE in the first group; and the TN signal for each MC-MTC UE indicates a transmission of one or more traffic signals by the MC-MTC UE during the traffic period in the dedicated MC-MTC traffic resources for the MC-MTC UE.

21. A Mission-Critical Machine Type Communication (MC-MTC) User Equipment (UE) comprising hardware processing circuitry configured to:

determine a presence of traffic data for transmission during a traffic period;

in response to the determination of the presence of traffic data, transmit, for reception at an Evolved Node-B (eNB), a transmission notification (TN) signal during a TN monitoring period in TN resources that are restricted for transmission of TN signals by MC-MTC UEs; and transmit, during the traffic period, one or more traffic signals based at least partly on the traffic data.

22. The MC-MTC UE according to claim 21, wherein:

starting times of the traffic period and the TN monitoring period are spaced apart by a predetermined time difference; and the predetermined time difference is not greater than 10 milliseconds.

23. The MC-MTC UE according to claim 21, wherein the TN signal is based at least partly on a first TN code sequence dedicated for a group of MC-MTC UEs that includes the MC-MTC UE.

24. The MC-MTC UE according to claim 21, the hardware processing circuitry further configured to:

determine an absence of traffic data for transmission during the traffic period; and in response to the determination of the absence, refrain from transmission of TN signals during the TN monitoring period and refrain from transmission of traffic signals during the traffic period.

* * * * *